United States Patent

Suchecki, Jr.

[11] Patent Number: 5,810,514
[45] Date of Patent: Sep. 22, 1998

[54] METHOD FOR INTRODUCING MATERIALS INTO A MEDIUM

[75] Inventor: Ronald J. Suchecki, Jr., Waco, Tex.

[73] Assignee: Terralift International, Ltd., Waco, Tex.

[21] Appl. No.: 832,140

[22] Filed: Apr. 8, 1997

Related U.S. Application Data

[63] Continuation of Ser. No. 537,991, Oct. 2, 1995, abandoned.

[51] Int. Cl.$^6$ .............. A62D 3/00; B09C 1/08; B09C 1/10
[52] U.S. Cl. .............. 405/128; 166/246; 166/280; 210/747; 435/262.5
[58] Field of Search .................. 166/246, 249, 166/271, 280, 308; 111/118, 129; 210/747; 405/128, 269; 435/262.5

[56] References Cited

U.S. PATENT DOCUMENTS

| | | |
|---|---|---|
| 2,789,522 | 4/1957 | Barton . |
| 3,335,798 | 8/1967 | Querio et al. ............ 166/246 |
| 4,429,647 | 2/1984 | Zinck . |
| 4,570,553 | 2/1986 | Ito ............ 405/269 X |
| 4,624,194 | 11/1986 | Zinck ............ 111/7.2 |
| 4,658,738 | 4/1987 | Zinck ............ 111/7.2 |
| 4,660,480 | 4/1987 | Zinck ............ 111/7 |
| 4,903,618 | 2/1990 | Blair ............ 111/118 |
| 4,992,174 | 2/1991 | Caplan et al. ............ 210/747 X |
| 5,032,042 | 7/1991 | Schuring et al. ............ 166/308 X |
| 5,115,750 | 5/1992 | White et al. ............ 111/118 |
| 5,131,472 | 7/1992 | Dees et al. ............ 166/308 |
| 5,133,625 | 7/1992 | Albergo et al. ............ 166/246 X |
| 5,178,078 | 1/1993 | Pendergrass ............ 111/128 |
| 5,205,360 | 4/1993 | Price ............ 166/308 |
| 5,265,678 | 11/1993 | Grundmann ............ 166/308 |
| 5,299,638 | 4/1994 | Cheneviere et al. ............ 405/128 X |
| 5,429,191 | 7/1995 | Schmidt et al. ............ 166/297 |
| 5,511,907 | 4/1996 | Tabasco ............ 405/128 |
| 5,525,008 | 6/1996 | Wilson ............ 405/128 |
| 5,560,737 | 10/1996 | Schuring et al. ............ 405/128 |
| 5,570,973 | 11/1996 | Hunt ............ 405/128 |
| 5,645,377 | 7/1997 | Kauschinger et al. ............ 405/128 X |

*Primary Examiner*—George A. Suchfield
*Attorney, Agent, or Firm*—William A. Bonk, III

[57] ABSTRACT

A method for introducing materials into a medium including creating passages in the medium with a blast of a pure preselected compressed gas that encourages activity of a preselected entity within or introduced into the medium and maintaining the passages with preselected materials for maintaining the passages.

8 Claims, No Drawings

METHOD FOR INTRODUCING MATERIALS INTO A MEDIUM

This application is a continuation of application Ser. No. 08/537,991 filed on Oct. 2, 1995, now abandoned.

BACKGROUND OF THE INVENTION

1. Field of the Invention

The present invention relates to agriculture. More specifically, the present invention relates to methods and apparatuses for loosening and remediating contaminated soil.

2. Description of the Prior Art

Environmental pollution and contamination is one of the greatest threats facing modern society. Environmental contamination invades the water supply for both human and the other populations on which humans rely. In dump sites and other storage facilities toxic pollutants emit noxious chemicals, liquids, gases, and other substances which can injure or even cause death to humans and the other populations. There are numerous sources of environmental pollution including the disturbance of naturally occurring deposits of toxic materials as well as a long list of contaminants introduced into the environment by human neglect, waste, dumping, or mismanagement. Some of these contaminants can be identified as motor oil and other petroleum based products, including gasoline, kerosene, diesel, hydraulic fluid, synthetic oils, other lubricating materials, and BTEX components; paints, paint thinners, and other volatile organic compounds; corrosive and deadly materials, such as chromium, arsenic, radio-active materials, and all other RCRA listed chemicals, compounds, and materials.

Environmental contaminants exist in either soil, water, some other medium, or a combined medium. A soil is best defined as actual dirt, clay, and other naturally occurring earthen substances. Soil is usually found in, at, or near storage containers for contaminants, both above and below the surface, industrial manufacturing and development locations, and other locations where contaminants are used, made, stored, or otherwise exposed to the environment. A medium is any manmade solid, or semi-solid substance where environmental contaminants can exist. A medium includes, for example, solid-waste disposal sites, such as dumps, where human garbage and trash is buried, compressed, or stored, man-made storage and contaminant substances, such as foam, sludge, gels, and other substances, and other more solid, permanent containment fields, such as concrete and cement.

In an attempt to prevent and remedy the detrimental effects of these environmental contaminants, two primary strategies have been implemented: ex-situ remediation and in-situ remediation. Ex-situ remediation consists of physically extracting the soil or other medium from the surrounding earth or under-ground location, treating the extracted soil or medium, and then replacing it into the surrounding earth. In-situ remediation attempts to treat and neutralize the contaminants that are latent within the soil or medium without physically extracting the contaminated soil or medium. The general practice of both ex-situ and in-situ remediation only attempts to treat the contaminants found in soils and does not attempt to treat the contaminants found in the other media. As a result, the following analysis of the prior art describes the most common ex-situ and in-situ remediation techniques for treating contaminated soils.

Ex-situ remediation by definition involves the removal of the contaminated soil from its native environment, treatment of the removed soil by either a physical or chemical means, and then a return of the soil to its original locus. After removing the soil, the common practice is to place or store the unearthed, contaminated soil in either a sealed or open air volatilization area for treatment. After treatment or simply removal from the contaminant's original location, the treated soil is either returned to its source or it is stored or buried in a hazardous waste landfill or contaminant area, where future liability exists indefinitely. If the contaminated soil is removed and not returned to its original removal site, then other soil must be found to fill the void that is left behind. Currently, ex-situ remediation utilizes several methodologies: Thermal Desorption, Thermal Destruction, Incineration, Stabilization, Solidification, Soil Washing, Chemical Treatment, Biological treatment, Land Farming, and other viable methods.

Because of the high costs of transportation, the potential impossibility of removal, and the damage inflicted on the land from which the soil is removed, as well as other negative factors, the in-situ theory and methodology has usurped the ex-situ theory and method of remediating contaminated areas.

In some situations, in-situ remediation has proved to be a more cost-effective and reliable method for remediating environmentally contaminated solid than any of the ex-situ methods, if and when it can be achieved. Generally, the goal of in-situ remediation is to neutralize or remedy the deleterious human and environmental effects of contaminated soils. The most prominent and advanced methods of in-situ remediation include Vitrification, Stabilization, Solidification, Soil Flushing, Air-Sparging, Free Product Recovery, Chemical Treatment, Electroosmosis, Vacuum Vapor Extraction, Bioremediation, Bio Venting, Hydraulic Fracturing, and Pressurized Pneumatic Fracturing.

Vitrification is a process used for stabilizing soils or sludge contaminated with radioactive, metallic, or certain organic wastes, whereby they are made "glass like." Vitrification can be performed in-situ or in special refractory liners. To perform in-situ vitrification, a mixture of ground glass frit and graphite flakes are inserted below the surface of the solid between 4 electrical probes. Electrical voltage is then applied to the electrodes which heats the surrounding soil and mixture, causing the mixture and the soil to melt. Once molten, the soil begins to conduct electrical current and the graphite is consumed by oxidation. The molten soil grows outward and downward until the desired vitrification depth is obtained. However, this electrical vitrification has two primary drawbacks: first, vitrification only seals the contaminant below the surface in a permanent form which cannot be removed or recovered and second, vitrification can only be performed to a contaminant twenty (20) feet or less beneath the surface.

Stabilization, as a broad categorization, includes different processes which attempt to make the environmental contaminants less soluble, mobile, or toxic and thus reduce the potential human and environmental risks caused by the contaminants. Stabilization can be achieved by changing pH, moisture contents, or chemical matrix. Although stabilization can neutralize some contaminants, the chemical nature of the waste is not necessarily changed.

Solidification refers to processes that encapsulate the contaminant into a monolithic solid of high-structural integrity. Solidification includes two primary classifications: microencapsulation, where small contaminated areas are solidified, and macro-encapsulation, where large areas of contamination are solidified. Solidification does not necessarily involve a chemical interaction between the contaminant and the solidifying reagents, but may mechanically bind the waste into the monolith. Contaminant migration is restricted by vastly decreasing the surface area exposed to a leaching area or by isolating the waste within an impervious capsule.

Soil Flushing attempts to enhance the mobilization or ability or the contaminants to move within a soil, so that the contaminant can be recovered or treated. Soil flushing uses water, enhanced water, mixtures (surfactants), or gaseous mixtures to accelerate one or more of the same geochemical dissolution reactions that alter contaminant concentrations in ground water systems. Soil flushing has two primary applications: one, the recovery of mobile degradation products which are formed after the soil has been treated with chemical oxidizing agents and two, oil recovery operations. Soil flushing is most effective in sandy soils and its effectiveness is dependent on the matrix as well as the organic, inorganic and contaminant composition of the soil or medium in which it is used.

Air sparging is accomplished by injecting air under pressure below the soil surface. Air sparging strives to volatize and biodegrade the contaminants located within the air-flow pathways latent within the soil. Also, air-sparging potentially allows the dissolved phase contaminants that contact the air-flow field to volatize or biodegrade. Air Sparging extends the utility of "soil vapor extraction." The primary draw-back to air-sparging is that once air is injected into the saturated zone, its flow is primarily governed by the applied pressure, buoyant forces, vertical and horizontal permeability distributions in the saturated zone, and the capillary properties of the soils. In short, air-sparging does not create new "air-flow zones" into which the contaminants can flow, volatilize, and biodegrade, but instead relies on the naturally occurring air-flow passageways.

The Basic Free Product Recovery system is a very simple means of recovering large quantities of free product, which is any type of spilled, leaked, or naturally occurring pools of potentially environmentally threatening contaminants in liquid form. In the usual basic free product recovery method a well is drilled into the ground which provides a low pressure space into which any existing "free product" can escape. This is an effective method for removing large quantities of liquids; however it has little or no effect on products which are not "free." One major draw-back to this process is that products which are not free but are bound in the clays, silts, or other components of the soil matrix, sediments, sludge, or water do not naturally "flow" into these low pressure areas. Moreover, this process in almost all cases must be coupled with other methods of remediation to excise the contaminants that are not free, and thus bring the contamination to acceptable levels.

Chemical treatment systems refer to the use of reagents to destroy or chemically modify target contaminants. These chemical processes are used to treat contaminated soils, ground water, surface water and concentrated contaminants. The use of the chemical treatment method is circumscribed by the innate limitation of chemicals to flow through solid, non-porous soils and media, thus limiting the depth of its application and its effectiveness at reaching the contaminant.

Electroosmosis was developed in the 1930's and has been used to dehydrate clays, silts, and fine sands in road beds, dams, and other engineering structures. The electroosmosis process is based on the fact that clay particles are usually negatively charged and thus attract positively charged ions (cations) to form a layer on the surface of water within the pores of the clay. If an electric field is established using electrodes, cations will migrate toward the cathode, bringing the water along with them. Electroosmosis provides uniform water flow through soils and media, including heterogeneous materials. The direction of water flow is easily controlled via the placement and polarity of the electrodes. Electroosmosis is an inadequate means to eradicate solid contaminants or contaminants that are not ionic.

The Basic Vapor Extraction system combines the use of vapor extraction wells with either blower or vacuum pumps. Basic Vapor Extraction drills wells, essential air passage ways, and then applies either a blowing or vacuum device to create a flow of contaminant vapor from zones permeable to vapor flow into the extraction wells. Vapor Extraction enhances the volatilization and removal of contaminants from the subsurface for treatment. The vacuum developed in the extraction well draws air from the above the soil atmosphere through the soil, so as to cause the different contaminants to volatilize and release into the moving air. More complex soil vapor extraction systems incorporate trenches, horizontal wells, forced-air injection wells, passive air inlet wells, ground water recovery systems, impermeable surface seals, multiple vapor extraction wells in single boreholes, and various thermal enhancements. The main limitation to the vapor extraction method is that air only moves into the pre-bored vaporization well holes and only those contaminants exposed to the pre-drilled well holes are able to be remediated.

Bioremediation exploits the ability of certain microorganisms, the heterotrophic bacteria and fungi, the degrade hazardous organic materials to innocuous materials such as carbon dioxide, methane, water, inorganic salts, and biomass. Microorganisms may derive the carbon and energy required for growth through biodegradation of organic contaminants, or, transform more complex, synthetic chemicals through fortuitous co-metabolism. There are two types of Bioremediation which are used: natural and enhanced. Natural Bioremediation depends on indigenous microbes to degrade contaminants using only nutrients and electron acceptors available in the remediation site. However, biodegradation rates will be less than optimal if the microbes' nutritional and physiological requirements are not met. Enhanced Bioremediation technologies increase biodegradation rates by supplying those nutrients, electron acceptors, or other factors that are rate limiting. Yet, even applying the current methods of in-situ remediation, neither correct nutrients to feed the indigenous microbes nor alien microbes can reach all or even most of the contaminants resident within the soil.

The current uses of bioremediation have been enhanced by utilizing the techniques of "bio-venting." Bio-venting is simply the application and combination of well hole boring and vacuum vapor extraction with the bioremediation methods discussed above. Under natural conditions aerobic biodegradation rates are typically limited by oxygen supply rates in the soil subsurface. The rate of oxygen supply to the subsurface is increased during the course of vapor extraction as air is drawn from the atmosphere into the subsurface. Therefore the enhanced supply of oxygen to the subsurface will increase the rate at which the aerobic biodegradation of contaminants can take place. However, the supply of air is still limited to the number of air-flow channels created by the number of well holes bored and the amount of contaminants and microbes exposed to the air flow.

Another means of in-situ remediation is hydraulic fracturing. Hydraulic fracturing is a technique developed in the oil and gas industry for creating openings in the soil subsurface. Hydraulic fracturing is accomplished by applying a high-pressure slurry of water or some liquid into the subsurface to create a lateral, pancake-shaped space in low-permeability zones. Sand in the slurry remains in the fracture, supporting it and keeping it open. Hydraulic fracturing is limited in its application because it can utilize only microbes that can live in the liquid or rely thereon.

One of the latest methods applied to in situ remediation is the pressurized pneumatic fracturing method developed by the New Jersey Institute of Technology (NJIT). The NJIT pressurized pneumatic fracturing method relies on a cylindrical probe inserted in the ground for means of transporting a pressurized gas below the surface of the ground for the purpose of pneumatically fracturing the soil. The process relies on the slow buildup of pressure to fracture the soil.

The desired benefits of the pressurized pneumatic fracturing method is that it should open sub-surface areas into which contaminants could flow and thus volatilize. However, while the pressure and buildup necessary to fracture the soil is being applied, it is a safe scientific inference to believe that the contaminants are actually being pushed into boundaries outside of the original contamination site, the contaminants are being further compacted into the existing soil, and thus frustrating and limiting the recoverability and remediation potential of the contaminant.

SUMMARY OF THE INVENTION

The present invention overcomes the limitations of the prior art by providing a method for fracturing a contaminated soil with a sudden, explosive blast of a preselected pure compressed gas. The preselected pure compressed gas is specially suited to encourage activity of preselected organisms already within or introduced into the medium. The present method also advances over the prior art by employing unique filler materials for maintaining the fissures or passages generated by the fracturing method, thus enhancing the remediation process.

Accordingly, a first object of the present invention is to provide a method for introducing material into a medium.

A second object of the present invention is to provide a method for introducing material into a medium including generating a shock-wave within the medium to molecularly and physically free the contaminants that are trapped in the media.

A third object of the present invention is to provide a method for introducing material into a medium including introduction of a pure compressed gas to enhance activity of preselected organisms within or introduced into the medium.

A fourth object of the present invention is to provide a method for introducing material into a medium including introducing organisms, chemicals, bio-active chemicals and inert material into the medium.

A fifth object of the present invention is to provide a method for introducing material into a medium to bring about certain reactions in the chemicals, aerobic and anaerobic organisms, and inert materials that are existing or have been injected into the media.

A sixth object of the invention is to provide improved elements and arrangements thereof in a method described herein that is dependable, economical and effective in accomplishing its stated and implied purposes.

DETAILED DESCRIPTION OF THE METHOD

The present method includes the step of creating at least one passage in the medium. This passage creation is accomplished, preferably, by injecting a blast of a preselected compressed gas into a medium. This method may be applied to numerous types of media, including soil, man-made structures, solidified contaminant masses, sludges, and other media where contaminants exist.

The sudden blast of compressed gas causes at least one shockwave to emanate through the medium from the point of release. A shockwave is an instantaneous disruption created by the presence of more energy on the wave front than the structure which is contacted by the wave can support. When the sudden burst of gas is released, a wave of energy is sent, both vertically and horizontally, through the medium, which instantaneously moves and disrupts the contaminant and the medium. This shockwave loosens the embedded contaminants and frees the soil, making contaminated areas accessible to gases or remediation agents such as chemicals, bio-active chemicals, organisms, or inert materials. The shockwave caused by the sudden burst of gas creates paths of least resistance within the medium, which serve two purposes: creation of gas-guiding passages for the introduction of materials to treat the contaminants and provision of free space into which contaminants can flow so that they can be treated.

Not only does the present invention emit a shockwave which disrupts the matrix and structure of the medium, the sudden burst of gas also creates a novel matrix of gas-guiding passages. When the sudden blast of air is released into the medium, the gas flows into the areas of least resistance and therefore follows the natural structure of the medium and creates voids through which gases could flow and materials could be introduced. The shape and dimension of the gas-guiding passages depends on two primary components: the location and angle of the release of the sudden burst of gas and the composition of the media. The angle of introduction of the gas will determine the angle and positioning of the matrix of gas-guiding passages, which would affect the types of treatments that could be applied to the particular medium. More importantly, however, is the understanding of the composition of the medium. Depending on the type of soil and its structural composition, the specific matrix created by the sudden burst will vary. Thus, a practitioner skilled in the art could determine the angle of introduction of the sudden burst of gas to determined the pattern and shape of the desired matrix of gas-guiding passages, so as to enhance the possible remediation of existing contaminants.

While some practitioners in the prior art make holes in the soil, none are as effective or as thorough as the gas-guiding passages created by the present invention. Practitioners in the prior art have either drilled vertical or horizontal wells, excavated or tilled the soil, or attempted medium fracture by means of slow pressure build-up. The physically invasive methods such as drilling, digging and tilling the soil actually alter the position and integrity of the soil, exposing certain parts to sun light, partially treating others, and leaving the majority of the soil contaminated and untreated. Contrarily, the gas-guiding passages created by the sudden burst of gas and the concomitant shockwave utilizes the naturally occurring fracture lines in the medium to evenly disrupt and expose the medium. This natural disruption pattern literally tears the medium, loosens the medium structure, and allows a greater amount of materials to reach the contaminants and thus enhance the remediation process.

A benefit gained from the present invention is that the soil structure is maintained without significantly affecting the life of the soil, as is the case with the mechanical means of treating the soil. Moreover the medium is torn according to the pre-defined, naturally occurring breaking lines and is made permeable, thus making the medium more accessible to preselected desirable gasses, such as oxygen.

The present invention is superior to the prior art in that the degree of disruption is controllable. The present invention can be used at differing depths and to differing degrees of fineness. The method according to the invention may be employed for breaking up the medium over wide surfaces in a coarse way as well as for breaking up the medium in a fine narrow mesh manner and is particularly suitable to break up deep-lying compacted zones. This applies to compacted medium of any type and with a moist medium simultaneously brings about a certain flow.

A crucial component of the invention is the employment of a pure, preselected compressed gas to fracture the medium. The specific gas used is determined in light of the entity, or entities, extant in, or simultaneously or subsequently introduced into, the medium. In other words, the gas choice depends on what entities are regarded as useful for the particular purpose to which the method is directed and what gases encourage their activity. For example, some aerobic organisms, such as bacteria, are well known for their ability to digest petroleum products and break them down into more environmental beneficial components. These kinds of bacteria perform the elemental breakdown of the petroleum product better in the presence of oxygen. Accordingly, applying the present method to a medium contaminated with a petroleum product would call for selecting pure oxygen as the fracturing gas agent. The blast of pure oxygen not only creates the necessary passages for infusing the medium with the remediative gas of choice, but also encourages the activity or digestive processes of the preselected bacteria that may already exist within the medium. The above example including an organism should not be construed as limiting gas selection to encouraging only organic activity. The present method embraces exploitation of useful enzymes and other inorganic matter which may exist or may be introduced into the medium.

The prior art includes many examples wherein air is employed to fracture the medium. It is well known that air does contain oxygen which may satisfy many organisms that fulfill the objectives of the present method. However, air also contains many other components that may harm or discourage the activities of the preselected organic and/or inorganic entities within or introduced into the soil. For example, some aerobic organisms may not be able to tolerate any amount of carbon dioxide introduced into a medium. If a blast of air were used to fracture the medium followed by te introduction of pure oxygen, the particular aerobic organisms of interest already may have perished even in the presence of trace amounts of the carbon dioxide in the air used.

The result of the sudden burst of gas and the concomitant shockwave is a series of gas-guiding passages which can be held open or maintained with maintaining material, such as microorganisms including anaerobic and aerobic bacteria, and various classes of fungi; inorganic materials such as absorbents, chemicals, chemical compounds; organic substances such as enzymes, bio-active sludge, cellulose, compost, humus, pete; and inert materials such as sand, diatomaceous earth, Fullers earth, barite, bentonite, polystyrene beads; or similar materials known to those skilled in the art to maintain fissures or passages. The introduction of these materials into the gas-guiding passages ensures that these spaces will serve as permeable passageways for water, gases, liquids, and other materials.

Once the sudden burst and concomitant shockwave has ruptured the soil and created gas-guiding passages, the practitioner may introduce materials which neutralize, volatilize, or react with the contaminant to make the medium safe to humans and other populations. Although most scenarios would require the practitioner to introduce specialized materials, the gas-guiding passages can be created in a formation, which allows the natural laws of science and physics to remedy the contamination process. The following represents, but should not be construed as limiting, remediating materials that may be introduced into the passages: organisms, which consume or disintegrate the contaminant; nutrients, in the form of air or any other compressed gas, which feed and sustain the organisms in the medium, whether naturally occurring or manually introduced; chemicals, which react and stabilize the contaminant; bio-active chemicals which cause certain biological organisms to respond and destroy or neutralize the contaminant; and inert materials, which would maintain the gas-guiding passages and thus maintain the gas and liquid permeability of the medium. Most importantly the present invention assures that the treatment and thus the contaminant is treated in a homogenous manner.

Although the invention has been described with reference to specific embodiments, this description is not meant to be construed in a limited sense. Various modifications of the disclosed embodiments, as well as alternative embodiments of the invention will become apparent to persons skilled in the art upon reference to the description of the invention. The appended claims are intended to cover all embodiments that fall within the scope of the invention.

I claim:

1. A method for introducing materials into a medium comprising the steps of:

creating at least one passage in the medium through a sudden burst of compressed gas specifically adapted to encourage activity of a preselected entity extant within the medium; and introducing into the at least one passage a material maintaining the at least one passage;

said material maintaining the at least one passage being selected from the group consisting of anaerobic and aerobic bacteria, fungi, enzymes, bio-active sludge, cellulose, compost, diatomaceous earth, Fullers earth, barite, bentonite, and combinations thereof.

2. A method as recited in claim 1, wherein said step of creating at least one passage in the medium includes introducing into the medium at least one shock wave.

3. A method for introducing materials into a medium consisting essentially of introducing into the medium a blast of a compressed gas specifically adapted to encourage activity of at least one preselected entity extant within the medium.

4. A method for introducing materials into a medium consisting essentially of the steps of:

creating at least one passage in the medium with a sudden blast of a compressed gas specifically adapted to encourage activity of at least one preselected entity extant within the medium; and introducing into the at least one passage at least one remediating material.

5. A method as recited in claim 1, including the step of introducing into the at least one passage at least one remediating material.

6. A method as recited in claim 1, wherein said compressed gas is oxygen gas.

7. A method as recited in claim 3, wherein said compressed gas is oxygen gas.

8. A method as recited in claim 4, wherein said compressed gas is oxygen gas.

* * * * *